(12) United States Patent
Mayers et al.

(10) Patent No.: US 9,241,030 B2
(45) Date of Patent: Jan. 19, 2016

(54) SCANNER WEB SERVICE FOR WEB APPLICATION AND SCANNER DRIVER COMMUNICATION

(71) Applicant: EMC Corporation, Hopkinton, MA (US)

(72) Inventors: Clay Mayers, San Diego, CA (US); Rao Kota, Cupertino, CA (US); Kirill Vanyukov, Saint-Petersburg (RU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/634,091

(22) Filed: Feb. 27, 2015

(65) Prior Publication Data

US 2015/0244783 A1 Aug. 27, 2015

Related U.S. Application Data

(63) Continuation of application No. 13/537,726, filed on Jun. 29, 2012, now Pat. No. 8,994,967.

(51) Int. Cl.
*H04L 29/08* (2006.01)
*G06F 17/30* (2006.01)
*G06F 21/00* (2013.01)
*H04L 29/06* (2006.01)

(52) U.S. Cl.
CPC .......... *H04L 67/10* (2013.01); *G06F 17/30964* (2013.01); *G06F 21/00* (2013.01); *H04L 63/00* (2013.01); *H04L 67/02* (2013.01); *H04L 67/42* (2013.01)

(58) Field of Classification Search
CPC ........................................................ H04L 67/10
USPC ............... 358/1.13, 1.14, 1.15; 709/203, 201; 715/760
See application file for complete search history.

(56) References Cited

U.S. PATENT DOCUMENTS

| | | | | |
|---|---|---|---|---|
| 2005/0094208 A1* | 5/2005 | Mori | ........................ | G06F 17/24 358/1.18 |
| 2010/0165392 A1* | 7/2010 | Yabe | .................... | G06F 21/6218 358/1.15 |
| 2010/0230242 A1* | 9/2010 | Basu | ..................... | G01N 23/046 198/502.2 |
| 2011/0242554 A1* | 10/2011 | Farry | ..................... | G06Q 30/00 358/1.6 |
| 2012/0250956 A1* | 10/2012 | Bocirnea | ................ | H04N 19/48 382/128 |

* cited by examiner

*Primary Examiner* — Jacky X Zheng
(74) *Attorney, Agent, or Firm* — Van Pelt, Yi & James LLP (57) ABSTRACT

A computer system with a scanner web service set up as a local host is provided. An HTTP message is received from a client-side web application code client-side running in a web browser on the computer system by the scanner web service. A message based on the received HTTP message is sent to a scanner driver that is in communication with a scanner connected to or integrated with the computer system. Scanned image information is received from the scanner driver, and is provided to the client-side web application code running the web browser.

20 Claims, 4 Drawing Sheets

SCANNER WEB SERVICE FOR WEB APPLICATION AND SCANNER DRIVER COMMUNICATION

CROSS REFERENCE TO OTHER APPLICATIONS

This application is a continuation of co-pending U.S. patent application Ser. No. 13/537,726, entitled SCANNER WEB SERVICE FOR WEB APPLICATION AND SCANNER DRIVER COMMUNICATION filed Jun. 29, 2012 which is incorporated herein by reference for all purposes.

BACKGROUND OF THE INVENTION

Web browsers usually operate in a sandbox and do not allow web applications to access any of the hardware on a client computer. Therefore it is hard to use a web application to scan images using a scanner and upload scanned images to the internet. Current workarounds for this problem include installing plug-ins to the web browser or using Active X controls. However, plug-ins are browser dependent and still do not let web applications contain a webpage that comes from an application server or web server to access scanner hardware on the client computer. Active X controls used by web applications can access hardware but require permissions and could be a source of attacks depending on the source of the Active X control. For that reason, many Active X controls are blocked by network administrators and not trusted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to allow client-side web application code to interact directly with a connected scanner, such as to obtain scanned image data, is disclosed. A scanner web service is set up as a local host on the client computer that allows communication between client-side web application code running in a web browser and a scanner driver. The scanner driver communicates to a scanner connected to the client computer to control and use the scanner. In some embodiments, the client-side web application code sends HTTP messages through an HTTP connection to the scanner web service set up as a local host. In some embodiments, the scanner web service is asynchronous. In some embodiments, an application programming interface (API) is provided. The API in some embodiments includes a set of predefined method calls that the scanner web service accepts.

In some embodiments, the scanner web service accepts HTTP messages that set, get, and/or control scanner functions and scanner configuration. The scanner web service communicates to a scanner driver to instruct the scanner to scan a page. In some embodiments, the scanner web service receives scanned image information from the scanner driver and stores the scanned image information in local storage of the client computer. The scanner web service encodes the scanned image information before providing the scanned image information to the client-side web application code. The client-side web application code receives scanned image information and provides the scanned image information to be displayed in the web browser, for example. In some embodiments, the client-side web application provides the scanned image information to an application server for further processing or to be stored.

Figure 1:
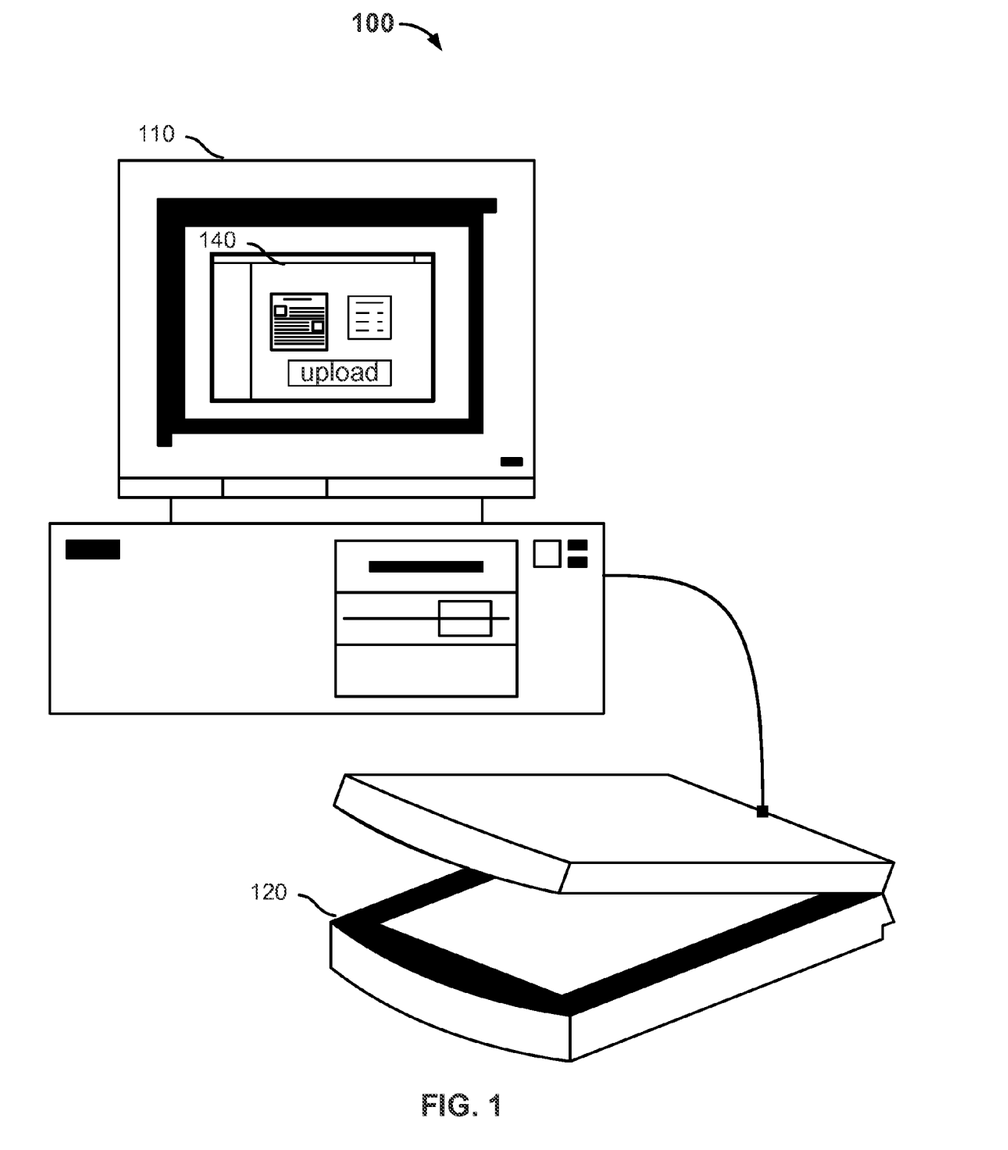
FIG. 1 is an illustration of an embodiment for a system with a scanner web service that allows communication between a client-side web application code running in a web browser on a client computer and a scanner.

FIG. 1 is an illustration of an embodiment for a system with a scanner web service that allows communication between a client-side web application code running in a web browser on a client computer and a scanner. Client computer 110 comprises a processor and a local storage in system 100. A user using client computer 110 can navigate to a webpage that provides a web application that allows the user to scan a document or image using scanner 120 and upload it to the internet. For example, a user uses an online bookkeeping web application and the user attaches a scanned image of the receipt for a business expense using the scanner connected to the user's computer. Also, for example, a user is using an online document storage service and would like to scan and upload documents to the online document storage service.

Scanner 120 is connected to client computer 110. Client computer 110 is installed with a scanner driver to allow communication between client computer 110 and scanner 120. Client computer 110 can be a laptop, a computer, a tablet, a smart phone or general computing device that is able to connect to a scanner. Scanner 120 is a device that includes optical elements to make a digitized image or electronic image of a physical paper or printed media.

Web applications are applications that are accessed via a web browser (e.g., web browser 140) and typically involve a connection with a remote server. Web applications typically involve client-side web application code that comprises code that is executed by a browser and server-side application code that processes and/or stores information from the client-side portion. The server-side application code serves or sends client-side web application code to the client computer when a user navigates to a webpage with which the client-side web application code is associated. In some embodiments, client-side web application code is written in a scripting and/or markup language that is executed by web browser 140 to render the client-side web application code executable at the client computer. For example, a client-side web application code may be written in JavaScript and included in and/or downloaded by a web page that is provided to the client computer.

Figure 2:
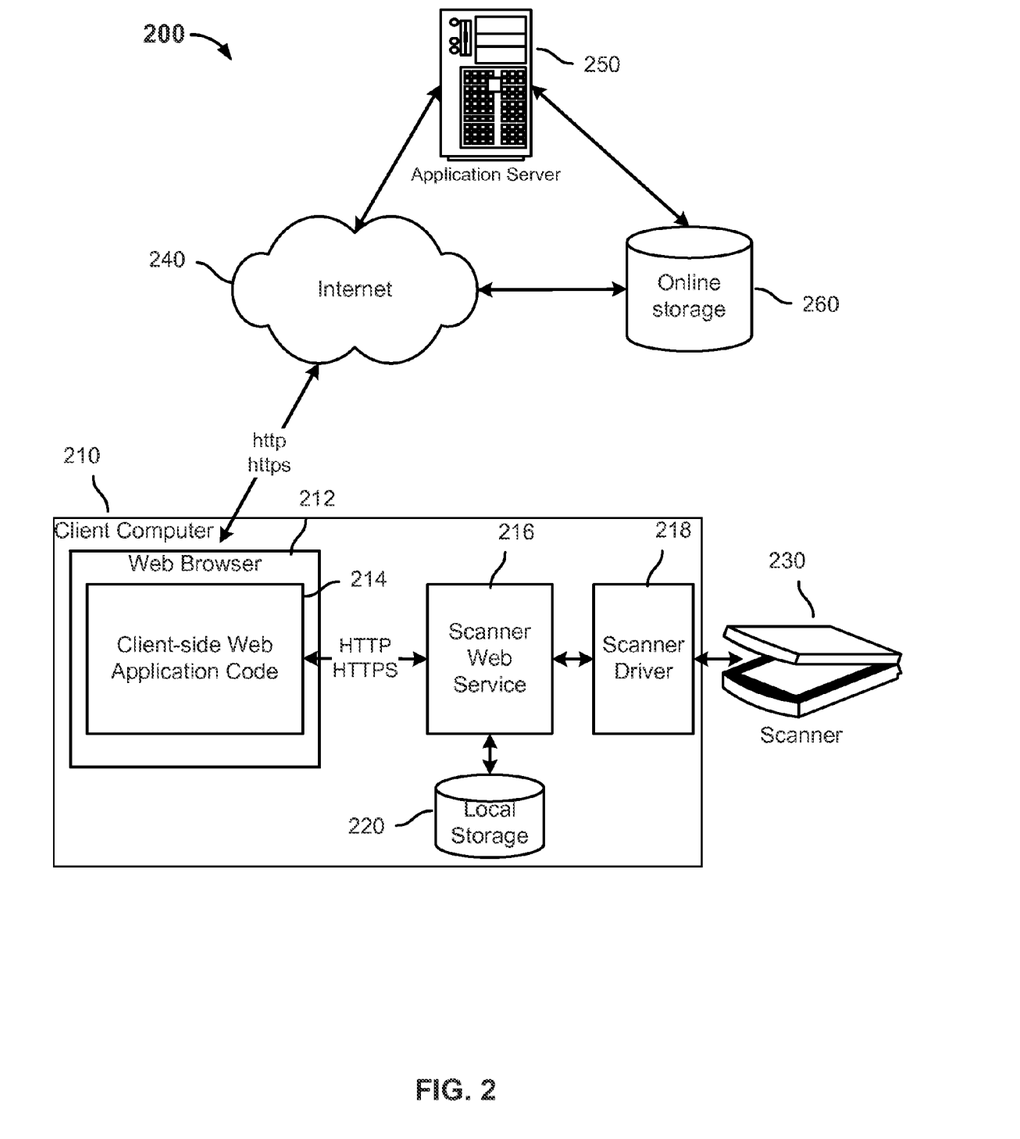
FIG. 2 is a block diagram of an embodiment of the scanner web service.

FIG. 2 is a block diagram of an embodiment of the scanner web service. A web browser (e.g., web browser 212 or 140 in FIG. 1) on a client computer (e.g., client computer 210 or 110 in FIG. 1) requests and receives web pages from application server 250 (or web server) through a network connection (e.g., Internet 240, or local area network, Wi-Fi, optical, or wireless carriers) in system 200. A webpage with a client-side web application code can be received from an application server and executed by web browser 212. Web browser 212 sends and receives data to application server 250 using a page load (e.g., an HTTP request, for example, when a user navigates to a page or clicks on a link) In some embodiments, client-side web application code 214 loaded into web browser 212 communicates with application server 250 using an asynchronous HTTP request (e.g., using AJAX (Asynchronous JavaScript and XML) and an embedded XMLHttpRequest object in the webpage that does not require the web browser to do a page load). In some embodiments, client-side web application code uses the asynchronous HTTP requests to send and receive data to application server 250 for application server 250 to process. In some embodiments, client-side web application code 214 sends data to application server 250 to store. Application server 250 can also be one or more servers, or applications served from a cloud.

In some embodiments, client-side web application code 214 includes a scanning feature for a user to scan a document and upload the document over the internet to application server 250. In some embodiments, client-side web application code 214 is written in browser executable code. In some embodiments, client-side web application code is written in Javascript and includes HTML. In some embodiments, client-side web application code is written using standard browser executable code language that is browser independent, and can run on any web browser. In some embodiments, client-side web application code 214 is written using a user-installed web application framework as a plug-in to web browser 212. Other browser executable scripting languages or code can be used to write client-side web application code including JAVA™, SILVERLIGHT™, DHTML, HTML 5, and FLASH™.

In some embodiments, in order to allow a web application to scan to the internet, scanner web service 216 is a web service running as a local host on client computer 210. Just as web application code 214 is allowed to send and receive data through HTTP requests to application servers (e.g., server 250) that are external to client computer 210, client-side web application code 214 can send HTTP messages to scanner web service 216 installed as a local host (e.g., http:\\localhost\) on client computer 210. Scanner web service 216 installed on the client computer then has access to scanner driver 218 and hardware resources on the client computer, such as local storage 220. In some embodiments, scanner web service 216 sends messages to scanner driver 218 to instruct scanner 230 to perform scanner functions. Therefore, a user using a web application served from an application server can scan and upload images to the application server. In some embodiments, scanner web service 216 only accepts HTTP requests from the local machine (i.e., the client computer).

In some embodiments, client-side web application code 214 sends HTTP messages using Javascript to scanner web service 216 and parses the responses that are in JSON (JavaScript Objection Notation) format. JSON is a human-readable text-based data format for serializing object data. In some embodiments, client-side web application code 214 is written using a user-installed web application framework as a plug-in to web browser 212. In some embodiments, a scanner web service add-on library is provided for the user-installed web application framework to easily construct HTTP messages to scanner web service 216. For example, a user-installed web application framework is MICROSOFT™ SILVERLIGHT™ installed into a web browser (e.g., INTERNET EXPLORER™, CHROME™, FIREFOX™, or SAFARI™), and an add-on library to MICROSOFT™ SILVERLIGHT™ is provided so that a client-side web application code written with the SILVERLIGHT™ framework can interact with the scanner web service, which interacts with the scanner driver to control a scanner.

In some embodiments, client-side web application code 214 is served from application server 250 on a secure HTTP connection (e.g., https://connection). The secure web page with client-side web application code 214 running in web browser 212 is signed with a certificate issued by a trusted authority. In some embodiments, web scanner service 216 is set up as a local host that accepts secure HTTP connections (e.g., https://) bound with a self-signed certificate. So client-side web application code 214 can also establish a secure HTTP connection with scanner web service 216. A secure HTTP connection to local host scanner web service keeps all of the messages and data secured and prevents a warning to appear in the web browser that a portion of the content is unsecured. In some embodiments, two scanner web services are started on client machine 210. One scanner web service is an unsecured scanner web service and handles unsecured HTTP messages. The other scanner web service is a secured scanner web service and handles secured HTTP message that are signed with the self-signed certificate issued to the "localhost." In some embodiments, the self-signed certificate issued by "localhost" (i.e., the web service set up as local host) and issued to "localhost" is placed into the certificate store of the operating system and/or browser specific certificate stores.

Scanner driver 218 provides a communication interface from client computer 210 to scanner 230 to use scanner 230 to scan pages. Scanner 230 is a scanner with various settings and functions to scan physical pages into an electronic image of each page. In some embodiments, scanner 230 is configured to scan the physical page with various image settings and provide image data and image metadata. In some embodiments, scanner driver 218 is a scanner driver that conforms to the ISIS (Image and Scanner Interface Specification) scanning standard. In some embodiments, scanner driver 218 is a scanner driver that conforms to the TWAIN standard. In some embodiments, scanner driver 218 implements both ISIS and TWAIN driver standards and can communicate with both ISIS scanners and TWAIN compliant scanners. In some embodiments, scanner web service 216 is compatible and communicates with ISIS scanner drivers. In some embodiments, scanner web service 216 is compatible and communicates with TWAIN scanner drivers. In some embodiments, scanner web service 216 is compatible with a scanner driver that combines a TWAIN scanner driver with an ISIS driver.

In some embodiments, scanner web service 216 is included with the scanner driver 218. For example, the scanner web service is installed at the time the user gets a scanner and installs the scanner on their computer (e.g., client computer 210 or 110 of FIG. 1). In some embodiments, scanner web service 216 is installed separately from the scanner driver. For example, when a user wants to use a web application that uses a scanner, the user will download and install scanner web service 216 the first time the user uses the web application.

Figure 3A:
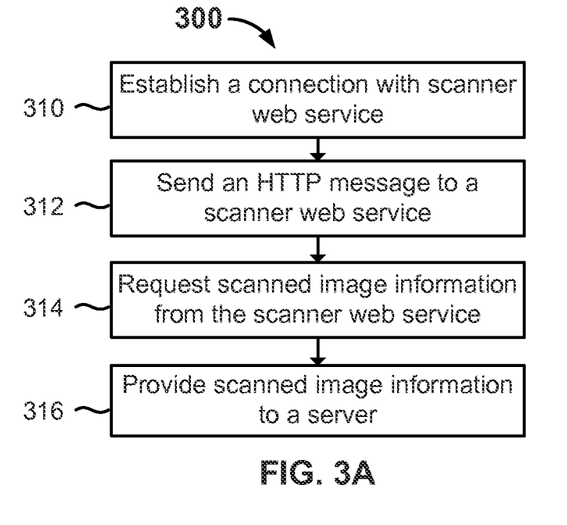
FIG. 3A is a flow chart illustrating an embodiment of a method that client-side web application code uses to request scanner web service for a scanner to scan a page and send the received information to a server.

FIG. 3A is a flow chart illustrating an embodiment of a method that client-side web application code uses to request scanner web service for a scanner to scan a page and send the received information to a server. At least a portion of 300 is performed by client-side web application code 214 of FIG. 2 executed by web browser 212 of FIG. 2 on client computer 210 of FIG. 2.

At 310, in some embodiments, a web application (e.g., client-side web application code 214 of FIG. 2) establishes an asynchronous connection with a scanner web service (e.g., 216 of FIG. 2) installed as a local host on the client computer. In some embodiments, the web application hosted on a server (e.g., application server 250 of FIG. 2) and the client-side of the web application running in a web browser are subject to the same-origin policy when trying to access the local host. In some embodiments, JSONP (JSON with Padding) is used to overcome this limitation. In some embodiments, the web application (i.e., server-side web application code and client-side web application code) written in user-installed web application framework includes a policy file that allows cross domain access, particularly to the localhost. In some embodiments, the policy file that allows cross domain access for user-installed web application framework also allows scanned image information received from a scanner web service to be uploaded to a third-party server or third-party online storage to the web application. In some embodiments, the security configuration of the client computer is changed (e.g., by the user or by the scanner web service when the scanner web service is installed) to allow the web application access to domains across domain boundaries.

In some embodiments, in order for client-side web application code to establish a connection to a web scanner service set up as a local host, a list of ports is provided to the web application developer so that client-side web application code is instructed to look for a scanner web service at the local host of a port on the list of ports. In some embodiments, client-side application code sends an HTTP message to each port on the list of ports until client-side application code gets a proper response from the scanner web service. For example, in order to establish a connection, client-side web application code sends an HTTP GET request comprising a start a scan session to one of the designated ports of the scanner web service. Client-side web application code goes through the list of ports until it receives the expected response from the scanner web service. In some embodiments, the scanner web service is started at startup of the client computer. In some embodiments, the client computer has a list of unassigned ports to utilize to try to start a scanner web service. In some embodiments, the scanner web service starts two services on two different free ports from the list of ports, one service a secured service (e.g., an HTTPS service host) and one service an unsecured service (e.g., an HTTP service host).

In some embodiments, client-side web application code, when sending a request to scanner web service to initiate a scan session, also sends an application ID. In some embodiments, application ID is an identifier issued to web application developers to identify the web application that uses a scanner to scanner web service. In some embodiments, application ID is used to indicate that an application developer is licensed to use the scanner web service. In some embodiments, application ID is a self-validating identifier. In some embodiments, if application ID is not valid, the scanner web service places a watermark on all of the scanned images before sending the scanned images to the client-side web application code.

In some embodiments, the first time a user uses a web application that uses the scanner, the user will be prompted to give permission to allow that web application to use the scanner connected to the client computer. In some embodiments, the scanner web service determines that it is the first time a web application has used the scanner web service based on the application ID. The first time a web application uses the scanner, a pop-up window is displayed to the user to get the user's permission to allow the web application to access the scanner. In the event that the user does not allow the web application that uses the scanner permission to use the scanner, the web application will be blocked from using web scanner service.

In some embodiments, scanner web service returns a session ID in response to the initiate a scan session request. In some embodiments, a scan session comprises detecting and connecting a scanner device, configuring a scanner, starting a scan job, and ending a scan job. In some embodiments, a session ID identifies a specific scan session initiated by a web application.

At 312, client-side web application code sends an HTTP message to a scanner web service. In some embodiments, the scanner web service includes an API (Application Programming Interface) with predefined methods to set, get, and control scanner functionality and scanner configurations. The scanner web service API comprises a limited set of methods, thereby protecting the client computer from security attacks. The scanner web service only responds to method calls set forth in the scanner web service API. In some embodiments, the scanner web service API is a JSON API. The message sent to the scanner web service is an HTTP request message (e.g., HTTP GET) and result values are returned from the scanner web service in JSON format. In some embodiments, the scanner web service is an API written for a user-installed web application framework. In some embodiments, the HTTP message is generated using the add-on library to the user-installed web application framework. In some embodiments, HTTP messages sent to the scanner web service are URL encoded. URL encoded messages ensure that only legal characters in a URL are used to send HTTP messages. For example, method calls in the API to set scanner configuration can use any characters in UTF-16 and some of the UTF-16 characters that are not allowed in a URL, like "*". Therefore, the client-side web application code is required to URL encode some of the HTTP messages.

In some embodiments, scanner web service method calls return a result to the client-side web application code. In some embodiments, a result comprises a return code and associated additional data. For example, client-side web application code sends an HTTP GET request with the CreateScanJob method call in a query string. The CreateScanJob method starts a scan job (i.e., starts scanning a page) and returns the result of success or fail of starting the scan job. In some embodiments, the scan job is an asynchronous operation and continues after the result of CreateScanJob is returned until the images are scanned or the scan job is canceled. In some embodiments, client-side web application code sends an HTTP message to the scanner web service to check on the status of a scan job. For example, while a scan job is performing a scan of images, the scanner web service returns a status of "In Progress."

At 314, client-side web application code requests scanned image information from the scanner web service. In some embodiments, the message sent to the scanner web service 312 also includes a request for the scanned image information. In some embodiments, after the scanner is done scanning a page, scanned image information is sent to the scanner web service and the client-side application code can request the scanned image information from the scanner web service. In some embodiments, scanned image information comprises image data and image metadata. In some embodiments, image data in the context of an image object is returned using JSON. In some embodiments, scanned image information comprises an image ID. In some embodiments, the scanner web service responds to the client-side web application code request for scanned image information with image data (i.e., the bytes of the images file). In some embodiments, scanned image data is encoded before sending the bytes of the scanned image to the client-side web application code. For example, image data bytes are encoded with Base64 encoding and sent to the client-side web application code. In some embodiments, the image data includes stream objects of the scanned image information. In some embodiments, the image data includes a multi-page file of a plurality of images.

In some embodiments, client-side web application code provides the scanned image information to the web browser to be displayed. In some embodiments, the scanner web service provides an image URL to the client-side web application code which is composed into an image tag (e.g. HTML "<img . . . >" tag) and the scanned image information is viewed. For example, after receiving scanned image data from the scanner web service, client-side web application code displays a thumbnail of the scanned image. In some embodiments, the image URL is a link to an image file on the local storage.

In some embodiments, while the scanner is still scanning a page, client-side web application code requests scanned image information of pages that were scanned before the page being currently scanned. In some embodiments, scanner web service initiates communication with the scanner driver on a separate thread than the thread used to listen to HTTP messages from the client-side web application code. In some embodiments, only one scanner is allowed to be used, including only one session at a time and only one scan job at a time. In some embodiments, once a scan job has finished, a new scan job can be created in the same session, but not while a scan job is in progress.

At 316, the scanned image information is provided to a server by the client-side web application code. In some embodiments, the scanned image information from the scanner web service is sent to an application server (e.g., 250 of FIG. 2) or to an online storage (e.g., 260 of FIG. 2) as part of the function of the web application. For example, a user uses a web application (including client-side web application code) to scan a receipt in a scanner, and then the client-side web application code sends the scanned image of the receipt to the application server for extracting purchase amounts from the receipt and storing the information in the application server or online storage in communication with the application server. In some embodiments, the client-side web application code does further processing on the scanned image information before sending it to a server. In some embodiments, a portion of the scanned image information is provided to a server. For example, a user views the scanned images in the web browser and selects only a few images to send to the server to be stored.

Figure 3B:
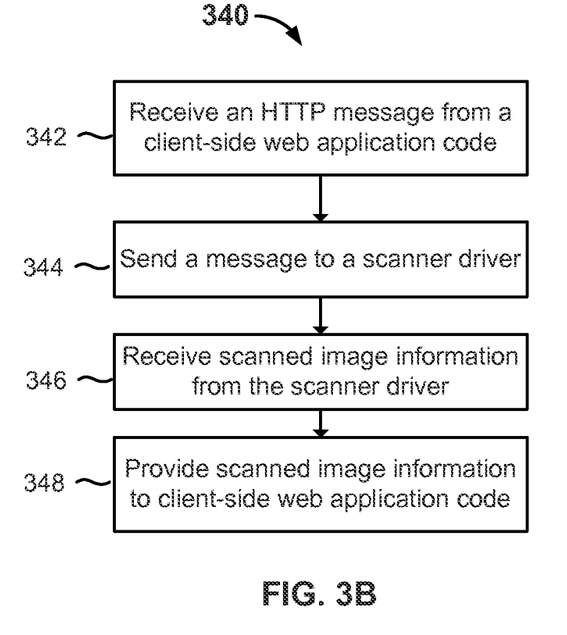
FIG. 3B is a flow chart illustrating an embodiment of a process by which a scanner web service communicates with a scanner driver and client-side web application code.

FIG. 3B is a flow chart illustrating an embodiment of a process by which a scanner web service communicates with a scanner driver and client-side web application code. At least a portion of 340 is performed by scanner web service 216 of FIG. 2.

At 342, the scanner web service receives an HTTP message sent by client-side web application code. In some embodiments, the HTTP message from the client-side web application code indicates what the client-side web application code would like the scanner to do. In some embodiments, the HTTP messages are HTTP requests that map to a method in scanner web service API to control a scanner and return a result code to the client-side web application code. In some embodiments, an HTTP message from the client-side web application code comprises a method call and one or more parameters associated with the method call. In some embodiments, the HTTP message from the client-side web application requires scanner web service to return some data. For example, the HTTP message comprises the GetImageData method call, and scanner web service returns the contents of the scanned image. Also for example, the HTTP message comprises the GetStatus method call and scanner web service returns the status of the scanner web service or scanner.

At 344, the scanner web service sends a message to a scanner driver. If the received message involves configuring or controlling the scanner (e.g., start a scan job, stop a scan job), then the scanner web service sends a message to the scanner driver. In some embodiments, the scanner web service generates and sends a message to the scanner driver comprising a scanner driver method and parameters based on the received HTTP message from the client-side web application code. In some embodiments, the scanner web service generates a message to the scanner driver in a format that the scanner driver understands. In some embodiments, the scanner driver is also implemented as a service, and operations of the scanner are executed asynchronously (i.e., the scanner driver does not wait until the scanner operation is done to return a result). In some embodiments, the scanner driver includes a component implemented as a service on the client computer to receive messages from the scanner web service, and the component interfaces with the scanner device.

In some embodiments, the scanner web service loads the scanner driver and the scanner when a scan session is started. In some embodiments, the scanner web service manages the life time of the scanner driver by detecting malfunctions of the scanner driver and shutting down and restarting scanner drivers. In some embodiments, the scanner web service is started as a service on a separate process space as the scanner driver. Separating the scanner web service and the scanner driver on different process space prevents corruption of the scanner web service.

At 346, scanned image information from the scanner driver is received. In some embodiments, the scanner scans images or scans pages based on the control messages received at the scanner driver. In some embodiments, scanned image information comprising image data is formatted by the scanner web service. In some embodiments, scanned image information is converted to a specified file type. In some embodiments, scanned image information is compressed. For example, raw image data is received from the scanner driver and the scanner web service converts raw image data into a JPEG format. In some embodiments, scanned image information is supplemented by image metadata. In some embodiments, one or more of the following metadata is added to the scanned image information returned to the client-side web application code: page side, blank page, bar codes, job separator, stream ID, page number, document ID, image number, or printed text. In some embodiments, a portion of the metadata is added by the scanner. In some embodiments, the scanner web service adjusts the scanned image information from the scanner. In some embodiments, one or more of the following adjustments are applied to the scanned image: brightness, contrast, rotation, cropping, offset, or scaling. In some embodiments, a portion of the adjustments desired by the client-side web application is applied by the scanner.

In some embodiments, the scanner web service stores image data and image metadata on local storage on the client computer (e.g., 220 of FIG. 2). In some embodiments, scanner web service generates an image URL to the stored image data and image metadata. In some embodiments, the image URL is a part of the image metadata. In some embodiments, the scanner web service manages the stored image data and image metadata and the image URL, and deletes stored image data and image metadata when the scanner web service is closed (e.g. when the client computer is shut down). In some embodiments, the scanner web service deletes stored image data and image metadata when the client-side web application code is closed or finished running, or when the browser is closed. In some embodiments, the scanner web service deletes stored image data and image metadata after a predetermined time interval (e.g. after 48 hours).

At 348, scanned image information is provided to the client-side web application code. In some embodiments, image data is encoded before sending to the client-side web application code. In some embodiments, image data and image metadata is formatted into an image object in JSON format. Then scanned image information comprising image data and/or image metadata is provided to the client-side web application code through the HTTP connection.

Figure 4:
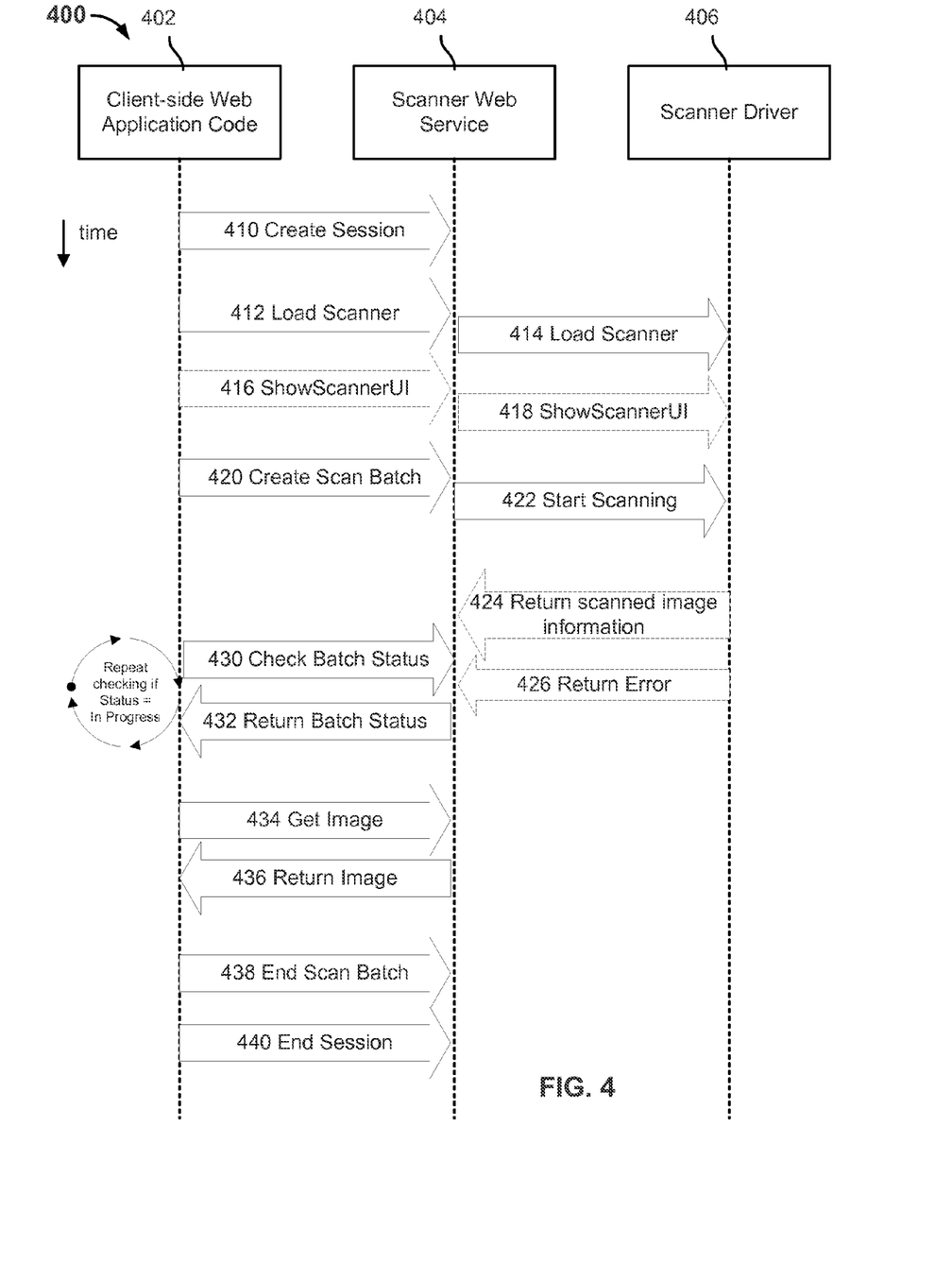
FIG. 4 is a flowchart illustrating an embodiment of a method for a web application to perform scanning of a page using the scanner web service.

FIG. 4 is a flowchart illustrating an embodiment of a method for a web application to perform scanning of a page using the scanner web service. At least a portion of flowchart 400 is performed by client-side web application code 402 (or 214 of FIG. 2), scanner web service 404 (or 216 of FIG. 2), and scanner driver 406 (or 218 of FIG. 2).

In some embodiments, the arrows of flowchart 400 represent messages passed between client-side web application code 402, scanner web service 404, and scanner driver 406. In some embodiments, in the flowchart of 400, arrows represent a method call to the scanner web service API or a method call to the scanner driver. In flowchart 400, the messages between client-side web application code 402, scanner web service 404, and scanner driver 406 in a timeline represent an example of a typical scan job using scanner web service.

At 410, create session is sent to scanner web service 404 from the client-side application code. In some embodiments, client-side web application code 402 connects to scanner web service 404 on a port that the client-side application code thinks the scanner web service will be on. If client-side web application code 402 receives a response that a scanner web service should send, then the web application has successfully connected to scanner web service 404. In some embodiments, scanner web service 404 returns a result with a session ID. In some embodiments, the session ID identifies a scanning session by a specific scanner with scanner configuration settings.

In some embodiments, scanner web service 404 receives a message from client-side web application code 402 to get a list of the scanners that are installed. In some embodiments, scanner web service 404 returns information about the scanners installed on the client computer. In some embodiments, client-side web application code 402 then provides the list to the user to select a scanner that is installed on the client computer to use. In some embodiments, scanner web service 404 provides a list to display to the user to select a scanner. In some embodiments, scanner driver 406 provides a GUI (Graphical User Interface) to select a scanner that is attached to the client computer.

At 412, load scanner is sent to scanner web service 404 from client-side application code 402. In some embodiments, the scanner that is loaded is the scanner that was chosen by the user. In some embodiments, the client-side application code sends a message to the scanner web service to load a scanner by a scanner name. At 414, load scanner is sent from scanner web service 404 to scanner driver 406. In some embodiments, scanner web service 404 loads the scanner by loading an instance of the scanner driver and then sending messages to the newly started instance of the scanner driver. In some embodiments, scanner web service 404 sends a message to scanner driver 406 to load a scanner or to activate the scanner (e.g., turn the scanner on or wake up the scanner or load necessary runtime executables to operate and communicate with the scanner).

In some embodiments, at 416, show scanner UI is sent to the scanner web service 404 from client-side application code 402. In some embodiments, the scanner UI comprises the scanner's configuration settings. In some embodiments, at 418, show scanner UI is also sent from scanner web service 404 to scanner driver 406. In some embodiments, the scanner driver provides the scanner UI. Using the scanner UI to set configuration settings is optional. In some embodiments, client-side application code 402 requests the scanner configuration from the scanner web service (and in some embodiments, the scanner web service requests the scanner configuration from the scanner driver). In some embodiments, the client-side web application code sets the scanner configuration. In some embodiments, the web developer who wrote the client-side web application sets the scanner configuration, using an HTTP message, to the scanner web service. In some embodiments, client-side web application code 402 provides a user interface for the user to set the scanner configuration in the web browser. In some embodiments, scanner configuration comprises scanner settings. In some embodiments, scanner settings comprise page size, color format, channels, dots per inch, and other settings and features of the scanner. In some embodiments, scanner UI also includes a user interface for the user to select a scanning area of the page to scan. In some embodiments, the scanner settings are set for multi-stream scanning so that more than one image is returned per page. In some embodiments, the more than one image comprises different modes of the scanned image. For example, a multi-stream scanning setting indicates that the scanner is to return a 24-bit color and a black and white image.

At 420, create scan batch is sent to scanner web service 404 from client-side web application code 402. In some embodiments, create scan batch starts a scan job with one or more pages as designated by the client-side web application code in the message. In some embodiments, a file type and an image compression for the scanned image information is indicated in the image. At 422, start scanning is sent to scanner driver

406 from scanner web service 404. In some embodiments, scanning is also an asynchronous operation by the scanner, and the scanner driver instructs the scanner to start, and returns a result to the scanner web service that the scan job has started. In some embodiments, a scan job ID is returned to the client-side web application code to identify the specific scan job that a set of scanned images will belong to. In some embodiments, client-side web application code 402 creates another scan job before the scan job is completed. Only one scan job can be scanning at a time, but there can be more than one scan job in a session. In some embodiments, client-side web application code 402 starts to get the scanned image information while the next scan job is scanning.

In some embodiments, at 424, scanned image information is returned by scanner driver 406 to scanner web service 404. In some embodiments, scanned image information is returned page by page from the scanner driver to the scanner web service. In some embodiments, if the scanner had an error during its normal operation, at 426, the scanner driver returns an error to the scanner web service. For example, if a scanner has an automatic document feeder and a page gets jammed that halts scanning, an error is returned. In some embodiments, the pages that were scanned and image information for the pages that were scanned are returned to the scanner web service. In some embodiments, in the event of a scanning error, the pages previously scanned are lost.

In some embodiments, scanner web service 404 stores the returned scanned image information in local storage. In some embodiments, scanner web service 404 formats or converts scanned image information. In some embodiments, scanner web service 404 provides an image URL to the stored scanned image information to client-side web application code. In some embodiments, scanner web service 404 adds metadata to scanner image information. In some embodiments, scanner web service 404 creates an image identifier for each image that the scanner driver returns. In some embodiments, scanner web service 404 breaks up scanned image information into separate images. In some embodiments, scanner web service 404 combines one or more scanned pages to create a multipage image.

At 430, check batch status is sent to scanner web service 404 from client-side web application code 402. While the scanner is still scanning or a scan job/batch is in progress, at 432, scanner web service 404 returns "In Progress" as the batch status. In some embodiments, batch status is not "In Progress," which indicates that the scan job is completed. In some embodiments, a Get Status message is sent at any time to the scanner web service to check on the status of the scanner. For example, the scanner web service will return "In Progress" if the scanner is not done loading.

In some embodiments, the client-side web application code repeatedly checks the batch status until the scan job is done and the returned batch status is not "In Progress." In some embodiments, client-side web application checks the batch status for a particular scan job using the scan job ID. In some embodiments, one scan job can be completed while another scan job is in progress. In some embodiments, after a scan job is complete, the images are available to be retrieved from the scanner web service.

At 434, get image is sent to scanner web service 404 from client-side web application code 402. In some embodiments, the scanned image information is requested from the scanner web service by client-side web application code using an HTTP request. At 436, the image is returned to the client-side web application code from the scanner web service. In some embodiments, an image ID is returned of the images in the scan job. In some embodiments, data of the scanned image information in a scan job is returned. In some embodiments, a stream object of the scanned image information is returned. In some embodiments, client-side web application code 402 requests scanned image information for a specific image ID in a scan job. In some embodiments, client-side web application code 402 receives more than one image ID from scanner web service 404 and sends a message to scanner web service 404 to combine the more than one image IDs into a multipage image, and return the multipage image ID.

At 438, end scan batch is sent to scanner web service 404 from client-side web application code 402. In some embodiments, end scan batch cancels a scan job and scanning, if a scan job is still in progress. In some embodiments, end scan batch closes a scan job and releases all resources including all images.

At 440, end session is sent to scanner web service 404 from client-side web application code 402. In some embodiments, end session closes the session and unloads the scanner.

Some operations of the scanner operate asynchronously and can last for a long, indeterminate time. In some embodiments, the following asynchronous operations are made available by scanner web service API: load scanner, load scanner by name, get scanner list, show scanner UI, create scan job, and get multipage ID. In some embodiments, an immediate result is returned like a status message or a scan job ID is available after calling one of the asynchronous operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:
a processor configured to:
  receive from a client-side web application code running in a web browser on the computer system an HTTP message to a scanner web service;
  generate a message based at least in part on the HTTP message;
  send the generated message to a scanner driver, wherein the scanner driver is in communication with a scanner connected to the computer system;
  receive the scanned image information from the scanner driver; and
  provide the scanned image information to the client-side web application code running in the web browser; and
a memory coupled with the processor, wherein the memory is configured to provide the processor with instructions.

2. The system as in claim 1, wherein the client-side web application code establishes a connection with the scanner web service by searching through a list of ports on the local host.

3. The system as in claim 1, wherein the client-side web application code establishes a connection with the scanner web service by receiving a start scan session HTTP message from the client-side web application code.

4. The system as in claim 3, wherein the start a scan session HTTP message includes an application identifier.

5. The system as in claim 1, wherein the client-side web application code is written in browser executable code.

6. The system as in claim 1, wherein the client-side web application code is written using a web application framework.

7. The system as in claim 1, wherein the client-side web application code uses an add-on library to generate HTTP messages to the scanner web service.

8. The system as in claim 1, wherein the processor is further configured to store the scanned image information from the scanner driver to local storage.

9. The system as in claim 1, wherein the HTTP message is sent over a secure HTTP connection from the client-side web application code to the scanner web service.

10. The system as in claim 1, wherein providing the scanned image information to the client-side web application code comprises providing scanned image information in JSON format.

11. The system as in claim 1, further comprising encoding the scanned image information.

12. The system as in claim 1, wherein the scanned image information comprises image data and image metadata.

13. The system as in claim 1, wherein the scanned image information comprises a stream object.

14. The system as in claim 1, wherein if the scanner web service is receiving the HTTP message from the client-side web application code for a first time to access the scanner connected to the computer system, then providing a pop-up message to receive user confirmation to allow the client-side web application code to use the scanner.

15. The system as in claim 1, wherein the scanner driver is an ISIS scanner driver.

16. The system as in claim 1, wherein the scanner driver is a TWAIN scanner driver.

17. The system as in claim 1, wherein the message to the scanner driver comprises a message to open a configuration settings GUI (Graphical User Interface), and receiving scanner configuration settings from the GUI.

18. The system as in claim 1, wherein the client-side web application code receives the scanned image information from the scanner web service and sends the scanned image information to a server.

19. A method comprising:
   providing a scanner web service set up as a local host on a computer system, wherein the scanner web service is configured to:
   receive from a client-side web application code running in a web browser on the computer system an HTTP message to the scanner web service;
   generate a message based at least in part on the HTTP message;
   send the generated message to a scanner driver, wherein the scanner driver is in communication with a scanner connected to the computer system;
   receive the scanned image information from the scanner driver; and
   provide the scanned image information to the client-side web application code running in the web browser.

20. A computer program product, the computer program product being embodied in a tangible non-transitory computer readable storage medium and comprising computer instructions for:
   providing a scanner web service set up as a local host on a computer system;
   receiving at the scanner web service, from a client-side web application code running in a web browser on the computer system, an HTTP message to the scanner web service, wherein the scanner web service only accepts HTTP messages from the computer system;
   generating a message based at least in part on the HTTP message;
   sending the generated message to a scanner driver, wherein the scanner driver is in communication with a scanner connected to the computer system and is configured to get scanned image information from the scanner at least in part in response to the generated message;
   receiving the scanned image information from the scanner driver; and
   providing the scanned image information to the client-side web application code running in the web browser.

* * * * *